Nov. 22, 1949    L. P. SHILDNECK ET AL    2,489,109
DYNAMOELECTRIC MACHINE
Filed June 23, 1948

Inventors:
Lloyd P. Shildneck,
John M. Lyons,
by  Gravell S. Mack
Their Attorney.

Patented Nov. 22, 1949

2,489,109

UNITED STATES PATENT OFFICE 2,489,109

DYNAMOELECTRIC MACHINE

Lloyd P. Shildneck, Marblehead, and John M. Lyons, Lynn, Mass., assignors to General Electric Company, a corporation of New York Application June 23, 1948, Serial No. 34,594

5 Claims. (Cl. 171—252)

Our invention relates to dynamoelectric machines and more particularly to an arrangement for minimizing the vibrational effect produced on the support of such machines by a rotating magnetic field. The invention is particularly applicable to turbine-driven generators because of their large size.

Heretofore, it has been known to have turbine generators with their stator laminations secured on key bars attached directly to spring bars which have their ends attached to the frame of the machine. In this manner a portion of the running vibrations of the stator laminations (caused by alternate attraction to and release from the magnetized poles of the rotating field members) are absorbed in the spring bars and not transmitted to frame and foundation. However, this "prior art" arrangement includes a multiplicity of inherently close clearances which must be accurately manufactured to prevent generation of objectionable noises which, in certain cases, are otherwise allowed to be produced by lack of clearance between the rigid frame and the floating members attached to the laminations.

It is an object of the present invention to provide an improved arrangement for flexibly supporting a stationary magnetic core inside a stationary frame.

A further object of this invention is to provide a flexible core mounting which will be simple and inexpensive to manufacture and which will provide for design standardization to a degree not hitherto practicable.

A still further object of the invention is to provide a system of core support and internal air sealing which can be made with relatively large clearances between floating and rigid parts to minimize the possibilities of vibration and noise due to accidental contacts between such parts.

Figure 1:
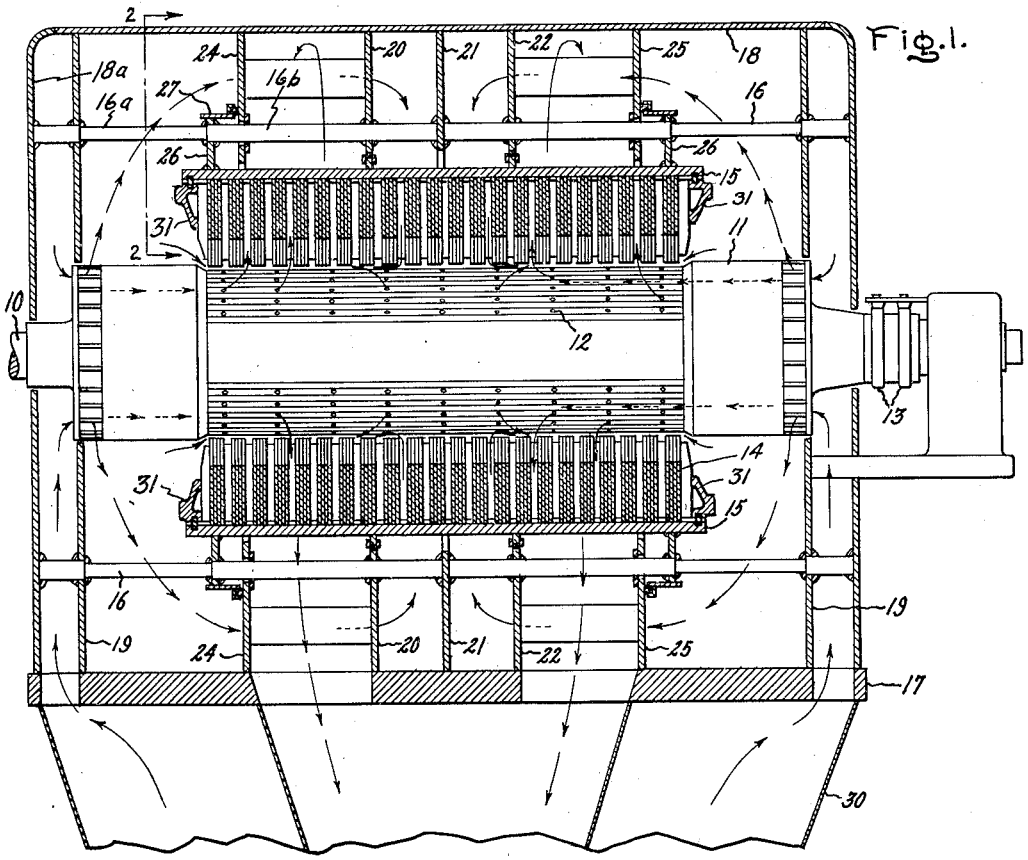
Figure 2:
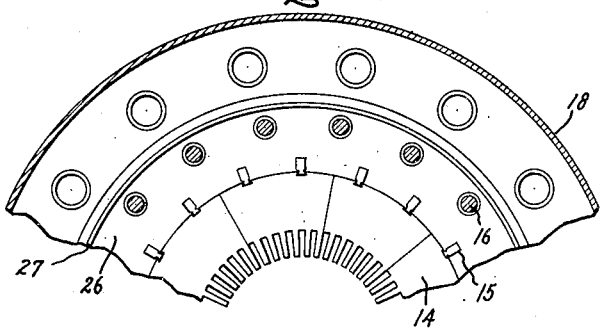
Figure 4:
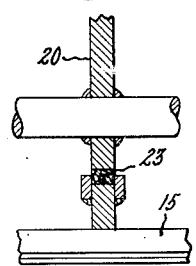
Figure 3:
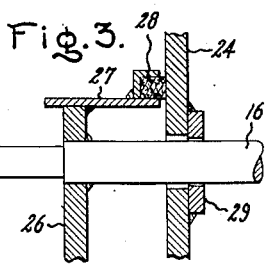

Further objects and advantages will become apparent and our invention will be better understood from consideration of the following description taken in connection with the accompanying drawing in which Fig. 1 is a side elevational view (partially broken away) of a dynamoelectric machine provided with an embodiment of our improved stationary core-supporting arrangement; Fig. 2 is a cross-sectional view taken along line 2—2 of Fig. 1; Fig. 3 is an enlarged view of a portion of Fig. 1 showing a stop-collar welded to the inner face of a web plate and surrounding a spring bar and also showing the seal provided by an air baffle, and Fig. 4 is an enlarged view of another air seal shown in Fig. 1.

Referring now to the drawing, we have shown our invention in connection with a dynamoelectric machine and including a shaft 10. Shaft 10 forms an integral part of a rotor 11 which comprises a magnetic core member provided with a rotor winding and with radial ventilating slots 12. The rotor winding (not shown) is adapted to be energized through slip rings 13 in conventional manner so that the rotor provides a rotating D. C. excited field. The rotor is arranged to operate within a stationary magnetic core member which comprises the stator punchings or laminations 14 which are held in place by dovetail key bars 15 arranged circumferentially with equal spacing from each other around the periphery of the laminations. Conventional clamping flanges 31 are used at each end of the laminations to hold them against axial movement along the key bars.

As is conventional in a machine of this general type, the stator frame comprises a base 17 and an outer wrapper 18 having end covers 18a and end plates or inner air shields 19. A plurality of inner transverse web plates 20, 21, 22, 24, 25 serve the dual purpose of supporting the stator laminations and dividing the air flows. This is conventional, but in accordance with our invention these inner web plates are either split (as are 20 and 22) or cut back at their inner bores (as are 24, 21, and 25) so that they no longer form a rigid mechanical connection from the outer frame wrapper to the stator laminations. Instead, the key bars holding the laminations are solidly attached at the ends by welding to annular rings 26, which in turn are supported from a plurality of circumferentially-spaced axially-extending flexible steel spring bars 16, which are welded thereto. At each circumferential location there are two spring bars, one for each axial half of the machine. The ends of each spring bar are welded to the respective end plate 19 and to the split web plate 20 or 22, and are also extended and welded to the respective end cover 18a and to center web plate 21 for additional end support. In this manner, the core is supported entirely from the centers of the spans of the spring bars, thus providing the necessary flexibility to dampen out the transmission of core vibrations to the outer frame.

A two-diameter spring bar indicated as 16a and 16b is often desirable to compensate for unequal spans on each side of the supporting ring 26 so that the bending stresses in the bar can be equalized and standard weldable bar steel can be utilized while still maintaining proper flexibility. Necessary axial stiffness is produced by the spring bars extending the entire length of the frame and welded to the various transverse plates. Those skilled in the art will also recognize that additional axial braces (not shown) may be provided between the wrapper plate and the inner edges of the rigid web plates, and between the inner floating portions of the web plates and the end supporting rings to insure additional rigidity of the structure.

The web plates 24 and 25 could be made in line with the annular rings 26. However, in order to increase the radial stiffness of these plates and at the same time provide a means for limiting the movement of the spring bars during short circuits on the machine they are shown carried inward nearly to the key bars and cut out to allow the spring bars to pass through with large clearances. At a few points (such as four on each end) stop collars 29 (see Fig. 3) may be welded to the inner faces of these plates (24 and 25) surrounding the spring bars to separate them therefrom by a predetermined clearance which can be accurately set after fabrication of the frame. The purpose of these stops is to limit the tangential movement of the spring bars during sudden short circuits when the whole core tends to twist around inside the frame. By thus limiting the deflection of the bars it is possible to limit their bending stresses and allow the use of a standard low carbon (readily weldable) bar steel.

The inner floating parts of web plates 20 and 22 are attached by welding to the key bars 15 and are separated from the outer rigid parts of said plates by resilient air seals of packing material 23, as shown in Figs. 1 and 4. The proper air circuits are thus maintained even though the web plates are split. Also, at each end an air baffle is provided between ring 26 and web plate 24 or 25 as shown in Figs. 1 and 3. The annular assembly 27 is welded to the outer edge of ring 26 and carries an annular ring 28 of resilient packing material which forms a seal against plate 24 (or 25). In all these seals ample clearance is provided between the adjacent metallic portions of the floating and rigid members to prevent accidental contact and the extra noise and vibration which might be caused thereby.

Arrows on Fig. 1 illustrate the general direction of air flow when a machine of the type illustrated and described is in operation. Although we have shown a machine of the type having duct work 30 extending to a cooler (not shown) below the machine, it will be readily understood by those skilled in the art that our invention is equally applicable to a machine having a top or side mounted cooler.

There is thus provided a simple, reliable and inexpensive construction which removes the necessity for precision manufacture required on conventional designs embodying inherently close clearances between floating and stationary members. There is also thus provided a machine which is inherently quiet in operation since it reduces the possibility of buzzing or other noises caused by interference between closely fitting unjoined members. In addition, with our invention the spring bars can be designed independently of the key bars, so that greater standardization of spring bar design is possible while providing the necessary variations in key bars to accommodate different sized laminations necessary for various machine output ratings.

While we have illustrated and described a particular embodiment of our invention, modifications thereof will become apparent to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States is:

1. A dynamoelectric machine having stator laminations of magnetic material, a plurality of axially extending key bars attached to said laminations for the support thereof, and a double frame structure for supporting said key bars, said double frame structure comprising an inner frame of a plurality of transverse web plates attached to said key bars, a substantially radially outer frame of an additional plurality of transverse web plates, and a plurality of circumferentially spaced spring bars each secured to at least one of said first-mentioned web plates and to at least two of said second mentioned web plates to interconnect said double frame structure.

2. A dynamoelectric machine having a rotor and a stator comprising an outer frame having end plates, a plurality of laminations of magnetic material having circumferentially spaced slots in their outer peripheries, a plurality of axially-extending key bars engaging said slots for holding said laminations, a plurality of transverse web plates extending from said frame radially inward toward said laminations, a plurality of circumferentially spaced bars of spring material secured to said end plates and to a portion of said plurality of web plates, the remainder of said plurality of web plates being adapted to provide a clearance with said spring bars, means for supporting said key bars from said spring bars, and means including seals of packing material to adapt said web plates to separate the flow of ventilating medium between said frame and said laminations.

3. A dynamoelectric machine having a rotor adapted to provide a rotating field and a stator comprising an outer frame having end plates, a plurality of laminations of magnetic material having circumferentially spaced wedge-shaped slots in their outer peripheries, a plurality of axially-extending key bars having dovetailed portions engaging said slots for holding said laminations, a plurality of transverse web plates extending from said frame radially inward toward said laminations, a plurality of circumferentially spaced axially-extending bars of spring material secured to said end plates and to a portion of said plurality of web plates, the remainder of said plurality of web plates being adapted to provide a clearance around each of said spring bars, means including annular ring portions for supporting said key bars from said spring bars intermediate the ends thereof, and mean including packing material to adapt said web plates to separate the flow of ventilating medium between said frame and said laminations.

4. A turbine generator stationary portion having large clearances and comprising an outer circumferential wrapper member and transverse air shields extending inward from said wrapper and for separating ventilating air chambers in said machine, a plurality of circumferentially spaced axially-extending spring bars each secured to at least two of said air shields and extending through at least one of said air shields with a clearance therebetween, a plurality of circumferentially spaced axially-extending key bars each secured to a plurality of said spring bars intermediate the ends thereof, a resilient seal of packing material interposed between laminations and air shields to which said spring bars are secured, and a plurality of annular assemblies associated with key bar to spring bar attaching means and adapted to hold annular rings of packing material against faces of air shields which form a clearance with said spring bars.

5. A turbine generator stationary portion having large clearances and comprising an outer circumferential wrapper member and transverse web plates extending inward from said wrapper and for separating ventilating air chambers in said machine, a plurality of circumferentially spaced axially-extending spring bars each secured to at least two of said plates and extending through at least one of said plates with a clearance therebetween, a plurality of circumferentially spaced axially-extending key bars each secured to two of said spring bars intermediate the ends thereof, each of said spring bars having a different cross-sectional area on one side of said attachment than on the other side thereof, a plurality of annular stop collars secured to the faces of a plurality of said plates forming a clearance with said spring bars, each for limiting the clearance between the associated plate and the associated spring bar, a resilient seal of packing material interposed between said laminations and plates to which said spring bars are secured, and a plurality of assemblies secured to said laminations and adapted to hold annular rings of packing material against faces of plates which form a clearance with said spring bars, whereby means are provided for ventilating said machine and for minimizing the transmission of vibratory forces and noises.

LLOYD P. SHILDNECK.
JOHN M. LYONS.

REFERENCES CITED

The following references are of record in the file of this patent:

UNITED STATES PATENTS

| Number | Name | Date |
|---|---|---|
| 2,342,502 | Taylor | Feb. 22, 1944 |